United States Patent [19]

Sogabe et al.

[11] Patent Number: 5,757,091
[45] Date of Patent: May 26, 1998

[54] PERMANENT MAGNET FIELD POLE FOR LINEAR MOTOR

[75] Inventors: Masatoyo Sogabe, Gotenba; Syougo Higashi, Oshino-mura, both of Japan

[73] Assignee: Fanuc Ltd., Yamanashi, Japan

[21] Appl. No.: 793,698

[22] PCT Filed: Jul. 3, 1996

[86] PCT No.: PCT/JP96/01842

§ 371 Date: Mar. 3, 1997

§ 102(e) Date: Mar. 3, 1997

[87] PCT Pub. No.: WO97/02647

PCT Pub. Date: Jan. 23, 1997

[30] Foreign Application Priority Data

Jul. 3, 1995 [JP] Japan ................. 7-166730

[51] Int. Cl.$^6$ .................................. H02K 41/03
[52] U.S. Cl. .................................. 310/12; 310/42
[58] Field of Search ........................ 310/12, 13, 14, 310/42, 258, 259, 154

[56] References Cited

U.S. PATENT DOCUMENTS 5,128,569  7/1992  Gladish ................. 310/12
5,345,669  9/1994  Zigler et al. ............. 310/42 X
5,450,050  9/1995  Ban et al. ............... 310/12 X

FOREIGN PATENT DOCUMENTS 3-31367   3/1991  Japan.
8-186974  7/1996  Japan.

Primary Examiner—Steven L. Stephan
Assistant Examiner—Judson H. Jones
Attorney, Agent, or Firm—Staas & Halsey

[57] ABSTRACT

A permanent magnet (2) whose upper surface has an S pole and a permanent magnet (2) whose upper surface has an N pole are arranged on a yoke plate (10) having a predetermined width and a predetermined length in the longitudinal direction of the yoke plate, thereby constituting one field pole unit F. Tenons (61) formed on the yoke plate (10) of the field pole unit F are engaged with tenon grooves (62) formed on both side portions (7a, 7b) of a frame member (7), so that a plurality of field pole units F are held by the frame member (7) in a manner such that the field pole units F are arranged in the longitudinal direction of the frame (7), thereby constituting a permanent magnet field pole for a linear motor.

6 Claims, 3 Drawing Sheets

5,757,091

PERMANENT MAGNET FIELD POLE FOR LINEAR MOTOR

BACKGROUND OF THE INVENTION

The present invention relates to an improvement of a permanent magnet field pole for a permanent magnet synchronous linear motor which is popularly used for driving a movable member of a machine tool.

DESCRIPTION OF THE RELATED ART

In order to drive a movable member of a machine tool, a permanent magnet synchronous linear motor is used. This permanent magnet synchronous linear motor has a structure, which comprises a shifting magnetic field generation means and a permanent magnet field pole, composed of a plurality of permanent magnets arranged to have N pole and S pole set alternately, and in which the shifting magnetic field and the permanent magnetic field pole are disposed confronting each other for enabling relative movement.

A conventional structure of this permanent magnet field pole is shown in FIG. 2. This magnetic pole has a structure in which a plurality of permanent magnets 2 are embedded in a resin layer 3 attached on the upper surface of a yoke 1 having a rectangular shape. These permanent magnets 2 are arranged in the longitudinal direction of the yoke 1 (i.e., an A'—A' direction shown in FIG. 2) such that magnetic poles on the upper surfaces of the permanent magnets 2 are alternately arranged in a manner like N, S, N, S, . . . Since the upper and lower surfaces of the permanent magnets 2 have opposite polarities as a matter of course, the poles of the lower surfaces are also alternately arranged like S, N, S, N, . . .

The dimensions (length and width) of the yoke 1 defines the dimensions of a field pole. In general, the length (dimension in the A'—A' direction in FIG. 2) of the yoke 1 ranges between 500 mm and about 10 m, and the width (dimension in the direction perpendicular to the A'—A' direction) is about 300 to 500 mm at most. The thickness is about 15 mm. As the material of the yoke 1, a soft iron plate is used. Each permanent magnet 2 has a magnetic flux density of about 1 Tesla and a thickness of about 5 mm.

This permanent magnet field pole is mounted on a machine tool or the like so that one end of each permanent magnet field magnetic pole is fixed opposite to the shifting magnetic field generation means and the other end relatively moves with respect to the shifting magnetic field generation means.

Since the permanent magnet 2 has a strong magnetic flux density of about 1 Tesla, it is not easy to attach the permanent magnet 2 to the yoke 1. Also, it is not easy to handle each field pole after the permanent magnet 2 is attached to the yoke 1. Depending on the situation, the field pole can be dangerous in handling. In addition, magnetization of the permanent magnets 2 may be performed after the permanent magnets 2 are assembled on the yoke 1 so that handling of the field pole is made easy. However, this operation is not easily performed by using an ordinary magnetizer.

DISCLOSURE OF THE INVENTION

It is an object of the present invention to provide a permanent magnet field pole for a linear motor in which an operation of attaching a permanent magnet to a yoke, handling of a field pole obtained by attaching the permanent magnet to the yoke, and magnetization after the mounting of the permanent magnet to the yoke can be made easy.

In order to achieve the above object, according to the first aspect of the present invention, there is provided a permanent magnet field pole for a linear motor, wherein a plurality of field pole units, each comprising a plurality of permanent magnets arranged and fixed on a rectangular yoke plate having a predetermined width and a predetermined length, are arranged in a manner such that magnetic poles, differing in polarity from adjacent poles, are sequentially arranged and fixed in the longitudinal direction of the yoke plate, and the plurality of field pole units are held by a frame member to be arranged in the longitudinal direction of the frame member.

According to the second aspect of the present invention, there is provided a permanent magnet field pole for a linear motor, wherein a plurality of first field pole units obtained by fixing permanent magnets whose upper surfaces are S poles in a line on a yoke plate having a predetermined width and a predetermined length and a plurality of second field pole units obtained by fixing permanent magnets whose upper surfaces are N poles in a line on a yoke plate having the same dimensions as that of the first field pole unit, the first field pole units and the second field pole units are held by a frame member so that the first and second field pole units are alternately arranged in the longitudinal direction.

As described above, each field pole unit has a width (i.e., the width of the yoke plate) which is substantially equal to the width of the permanent magnet field pole, but has a length which is one severalth of the length of the permanent magnet field pole system. For this reason, each field pole unit which was made small in size as described above is used as a unit of handling such as assembly or magnetization, so that an operation can be easily performed.

DESCRIPTION OF THE PREFERRED EMBODIMENTS

Figure 1:
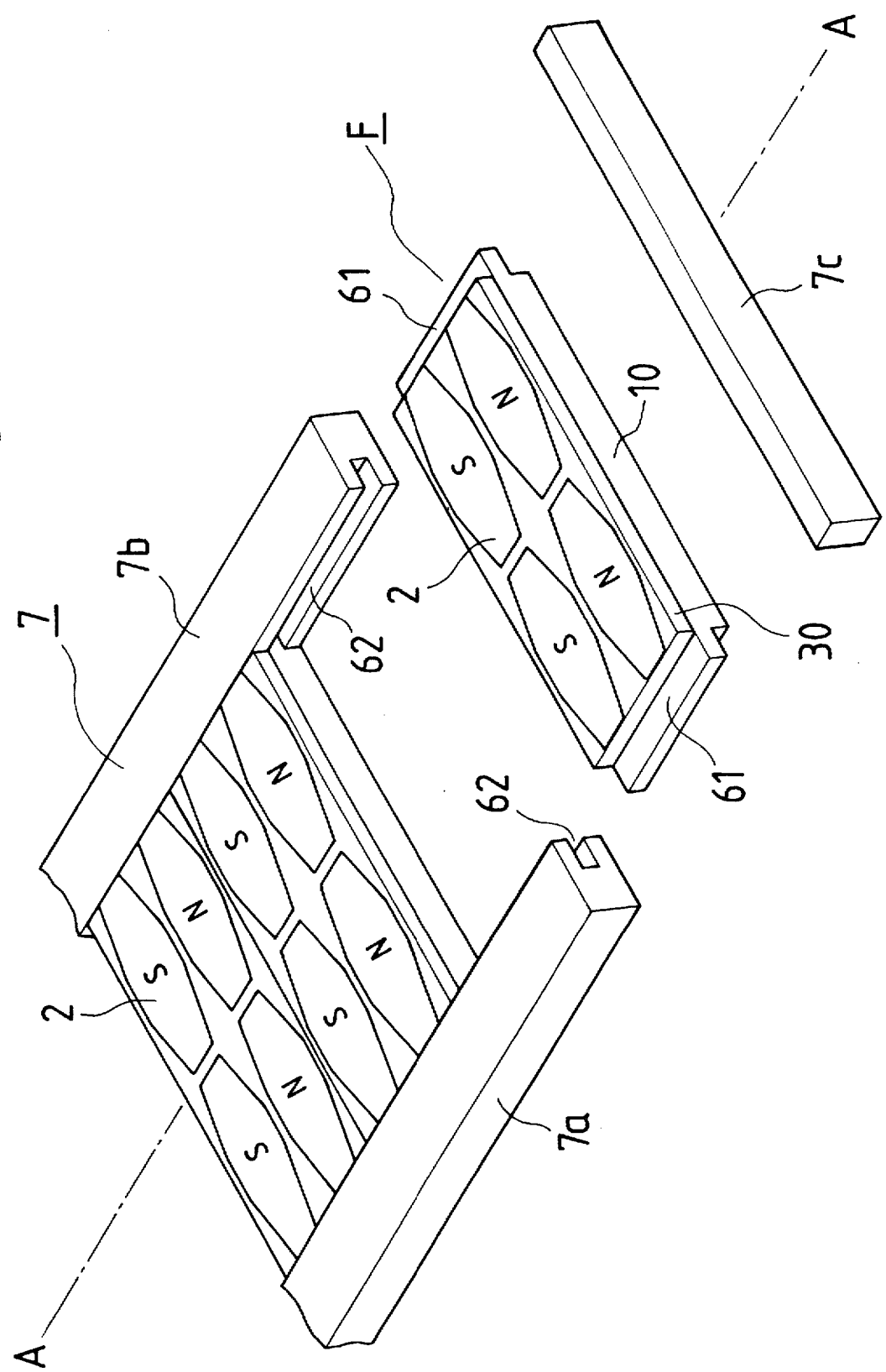
FIG. 1 is an exploded perspective view showing a permanent magnet field pole for a linear motor according to the first embodiment of the present invention.
Figure 2:
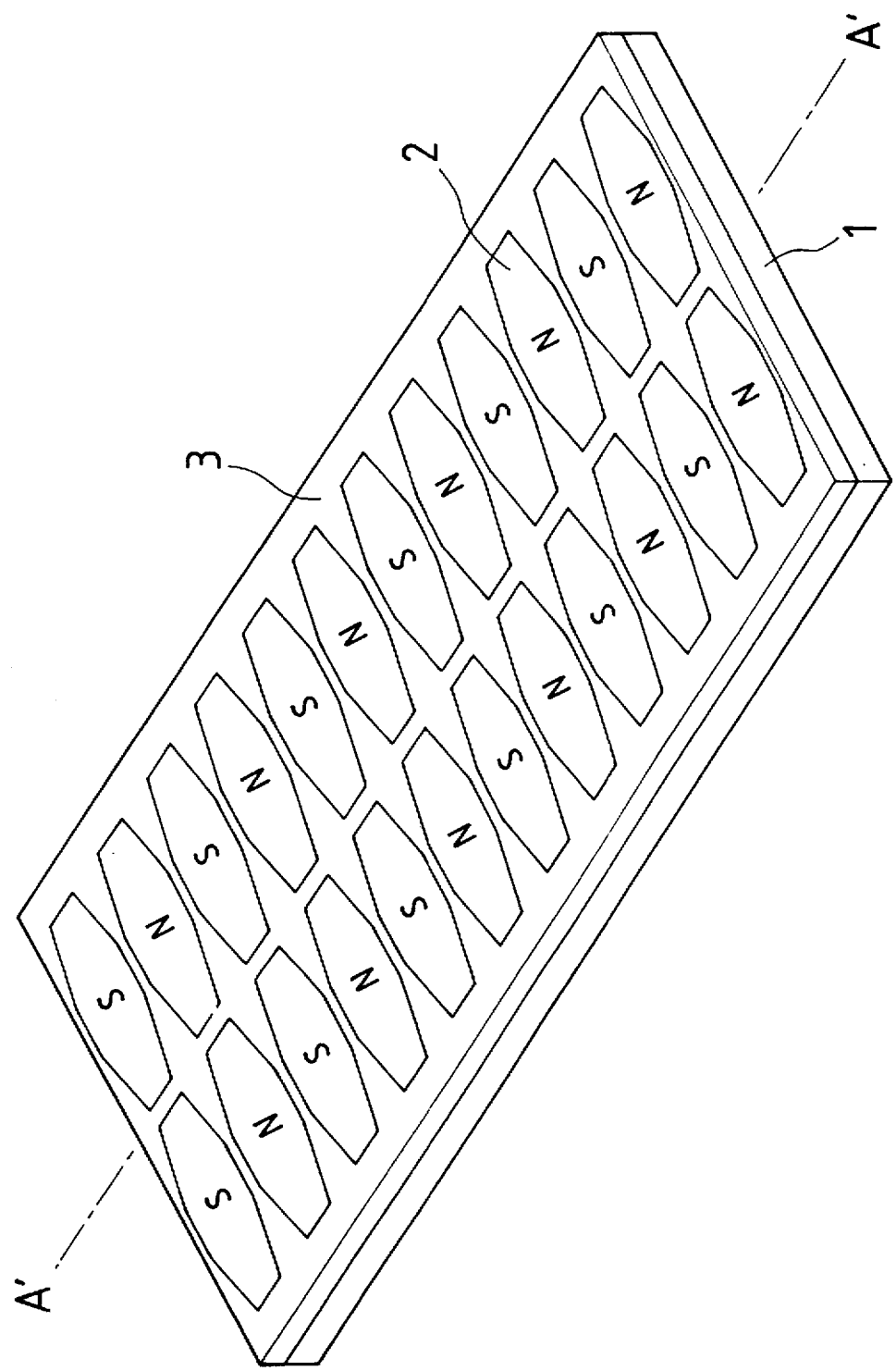
FIG. 2 is an exploded perspective view showing a conventional permanent magnet field pole for a linear motor.

According to the present invention, as shown in FIG. 1, a yoke for assembling permanent magnets constituting a permanent magnet field pole is divided into a plurality of yoke plates 10 having the same shape. The yoke plate 10 is formed as a rectangular flat plate, and a resin layer 30 is attached to the upper surface of the yoke plate 10.

One yoke plate 10 has a length which is one severalth of the length (dimension in A—A line in FIG. 1) of the permanent magnet field pole and a width (dimension in the direction perpendicular to A—A line) which is equal to the width of the permanent magnet field pole. A pair of permanent magnets 2 (arranged in the direction of the width) both of which upper surfaces are magnetized N-pole (with the lower surfaces magnetized S pole) and a pair of permanent magnets 2 (also arranged in the direction of the width) whose upper surface are magnetized S pole (with the lower surfaces magnetized N pole) are embedded in the resin layer 30 so that these permanent magnets pair are arranged in the longitudinal direction of the yoke plate 10, thereby constituting a set of a field pole unit F. The yoke plate 10 constituting the field pole unit F has tenons 61 which extend from both the left- and right-side ends in the direction of the width. The field pole units F have the same structure including the arrangement order of permanent magnets 2.

The plurality of field pole units F are fixed and supported by a frame member 7 for defining the outer shape of a permanent magnet field pole, and serve as a permanent magnet field pole. The frame member 7 is of a rectangular form, comprising left and right frame portions 7a and 7b whose lengths are substantially equal to the length of the permanent magnet field pole and front and rear frame portions (only a rear frame portion, 7c is shown in FIG. 1) whose lengths are substantially equal to the width of the permanent magnet field pole. Inside the frame portions 7a and 7b, there are provided tenon grooves 62 which can receive the tenons 61 formed on the yoke plate 10 constituting the field pole unit F.

To assemble a plurality of the field pole units F with the frame member 7, the rear frame portion 7c is removed first, and the field pole units F are inserted one after another into the frame member 7 from the rear side towards front side of the frame member 7, that is, in A—A direction of FIG. 1, while keeping the tenons 61 at the left and right sides of the yoke plate 10, a constituent of each field pole unit, slidably fit in the tenon grooves provided along the insides of the frame portions 7a and 7b. Finally, the field pole unit F located at the rear end position is pressed by the rear frame portion 7c. In this manner, the permanent magnet field pole is completed.

As described above, this permanent magnet field pole has a structure in which a plurality of field pole units F having the same shape, each arranged in the longitudinal direction, are enclosed by the rectangular frame member 7. For this reason, in assembling the permanent magnet field pole, the field pole units F, each having an area of only one severalth of the total area of the permanent magnet field pole, is handled separately, so that even if each magnet incorporated in the field pole unit F has a high magnetic flux density of about 1 Tesla, the assembling operation is not difficult. In addition, in case where if magnetization is to be performed after assembly of the permanent magnets 2, a conventional magnetizer can be used for each field pole unit F having the small area. Thus, the assembling operation can easily be performed.

According to the embodiment shown in FIG. 1, the field pole unit F comprises two pair of permanent magnets 2, one is magnetized S pole in its upper surface and the other magnetized N pole in its upper surface. These are arranged in the yoke plate 10 in two lines in the longitudinal direction of the yoke plate 10. The number of lines of the permanent magnets 2 incorporated in one field pole unit F is not limited to two. However, if the permanent magnets 2 are arranged in three lines, two types of field pole units F, i.e., the first type of field pole units F, in which permanent magnets are arranged in the order of S, N and S are incorporated and the second type of field pole units F, in which permanent magnets are arranged in the order of N, S and N are incorporated, have to be prepared, and these two types of field pole units F must be incorporated in the frame member 7 so that the same types of field pole units F are not adjacent to each other. In contrast, in case where the two pairs of permanent magnets 2 arranged in the order of S and N or N and S, are incorporated in two lines on the yoke plate 10, the same types of field pole units F can sequentially be arranged in the frame member (with the same orientation maintained), thereby enabling the adjacent permanent magnets arranged in the longitudinal direction in the frame member 7 to have different poles. The same manner as described above is applicable to a field pole unit F in which the permanent magnets 2 are incorporated in the yoke plate 10 in four lines.

In the embodiment shown in FIG. 1, the tenons 61 are formed on the yoke plate 10 which constitutes each field pole unit F, and the tenon grooves 62 are formed with the frame portions 7a and 7b of the corresponding frame member 7. However, in place of such an arrangement, tenon grooves may be formed with the yoke plate 10, and tenons 61 may be formed with the frame portions 7a and 7b. In addition, in order to keep a plurality of field pole units F arranged in the longitudinal direction by the frame member 7, not only the engagement between tenons and tenon grooves, but also another engagement means may be used. For example, external force may be exerted on the frame member 7 enclosing the plurality of field pole units F so that the abrasion between the side surfaces of the yoke plate 10 and the side surfaces of the frame portions 7a and 7b can be made to cause the field pole units F to engaged with the frame member 7.

Figure 3:
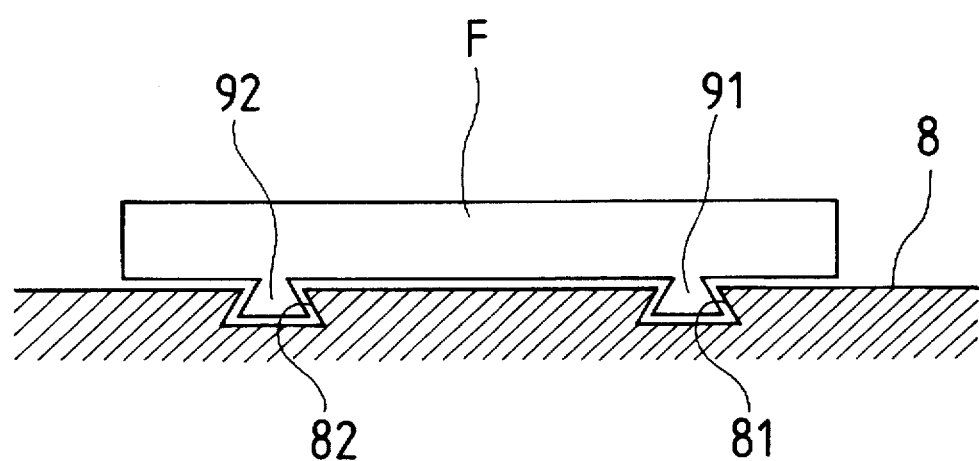
FIG. 3 is a sectional view showing a permanent magnet field pole for a linear motor according to another embodiment of the present invention.

In place of the structure in which the plurality of field pole units F are engaged with the frame member 7, the following structure may be used. That is, as shown in FIG. 3, one or a plurality of dovetail grooves 81 and 82, extending in the longitudinal direction (direction perpendicular to the paper plane of FIG. 3), may be formed on a surface 8, on which a permanent magnet field pole is mounted, while the projections 91 and 92 to be engaged with the dovetail grooves may be formed on the surface of each field pole unit F, which confronts the mounting surface 8.

What is claimed is:

1. A permanent magnet field pole for a linear motor, comprising:

a plurality of field pole units, in each of which a plurality of permanent magnets are arranged and fixed on a yoke plate having a predetermined width and a predetermined length in a longitudinal direction of said yoke plate in a manner such that the polarities of adjacent permanent magnets differ from each other in the longitudinal direction of the yoke plate; and a frame member for keeping said plurality of field pole units arranged in the longitudinal direction.

2. A permanent magnet field pole for a linear motor, including a plurality of first field pole units each of which comprises permanent magnets fixed in a line on a yoke plate, having a predetermined width and a predetermined length, with S pole on the surface, and a plurality of second field pole units each of which comprises permanent magnets fixed in a line on a yoke, having the same shape as that of the first field pole unit, with N pole on the surface, and then, the first field pole units and the second field pole units are held by a frame member in a manner such that the first and second field pole units are alternately arranged in a longitudinal direction.

3. A permanent magnet field pole for a linear motor according to claim 1 or 2, wherein a plurality of tenons projecting in a direction of the width are formed on both side ends of said yoke plate, which constitutes said field pole unit, and tenon grooves each having a width engageable with the tenon are formed on portions of said frame member corresponding to the side ends of said yoke plate.

4. A permanent magnet field pole for a linear motor according to claim 1 or 2, wherein a plurality of tenon grooves extending in the longitudinal direction of said yoke plate are formed on both side ends of said yoke plate, and tenons each having a thickness which can engage with one of the tenon grooves are formed with portions of said frame member corresponding to both the side ends of said yoke plate.

5. A permanent magnet field pole for a linear motor according to claim 1, wherein said field pole unit is obtained by arranging an even number of permanent magnets on said yoke plate in the longitudinal direction of said yoke plate.

6. A permanent magnet field pole for a linear motor, comprising:

a plurality of field pole units, in each of which a plurality of permanent magnets are arranged and fixed on an upper surface of a yoke plate, having a predetermined width and a predetermined length, so that magnetic poles of permanent magnets arranged adjacent to each other in a longitudinal direction of said yoke plate differ in polarity from each other, and at least one projection extending in the longitudinal direction are formed on a lower surface of said yoke plate; and a field pole mounting surface with which dovetail grooves for engaging with the at least one projection are formed.

* * * * *